United States Patent [19]

Castellano

[11] 4,222,240
[45] Sep. 16, 1980

[54] TURBOCHARGED ENGINE

[76] Inventor: Thomas P. Castellano, 4943 McConnell Ave., Los Angeles, Calif. 90066

[21] Appl. No.: 875,180

[22] Filed: Feb. 6, 1978

[51] Int. Cl.³ .......................................... F02B 37/00
[52] U.S. Cl. .................................................. 60/611
[58] Field of Search ........................ 60/600, 601, 611; 123/119 C

[56] References Cited

U.S. PATENT DOCUMENTS

| | | | |
|---|---|---|---|
| 1,818,767 | 8/1931 | Swartwout | 123/119 C |
| 1,984,013 | 12/1934 | Fast | 123/119 C X |
| 2,000,721 | 5/1935 | Standerwick | 123/119 C X |
| 2,283,694 | 5/1942 | Perrine | 123/119 C |
| 2,559,859 | 7/1951 | Elliott et al. | 123/119 C X |
| 3,324,651 | 6/1967 | Smith et al. | 123/119 C X |

FOREIGN PATENT DOCUMENTS

| | | | |
|---|---|---|---|
| 2435707 | 2/1976 | Fed. Rep. of Germany | 60/601 |
| 2441804 | 3/1976 | Fed. Rep. of Germany | 60/611 |
| 1437187 | 5/1976 | United Kingdom | 60/611 |

*Primary Examiner*—Michael Koczo
*Attorney, Agent, or Firm*—Freilich, Hornbaker, Wasserman, Rosen & Fernandez

[57] ABSTRACT

An improvement in a turbocharged engine of the type that includes an exhaust turbine driven by exhaust gases from the cylinders of the engine, and which drives a compressor located along an inlet conduit leading to the engine to supply compressed air to the cylinder. The improved system includes a recirculating passage which can carry compressed air from a point along the inlet conduit downstream of the compressor, back to a point along the inlet conduit which is upstream from the compressor turbine, to recirculate the air. A valve located along the recirculating passage, is operated by sensors detecting when the engine is operated at high loads, to then open the valves to cause recirculation of the air pumped by the compressor. The recirculation not only reduces the air pressure supplied to the cylinder to avoid overcharging of the engine, but also causes the two turbines to spin faster to minimize exhaust back pressure for greater engine efficiency and to enable the turbocharger impeller to pick up speed faster after a gear change.

4 Claims, 3 Drawing Figures

TURBOCHARGED ENGINE

BACKGROUND OF THE INVENTION

This invention relates to turbo-charger systems and turbo-charged engines.

A typical turbo-charger system includes a turbine shaft having an exhaust turbine at one end that is driven by exhaust gases from the engine cylinders, and having a compressor at the other end for providing compressed air to the engine. At very high engine loads, the engine may become overcharged and/or overheated, which can be prevented by reducing the inlet air pressure supplied by the compressor turbine. One commonly used method involves the use of an exhaust waste gate connected to the exhaust gas outlet of the engine for extracting some gas directly into the atmosphere instead of by way of the exhaust turbine, to reduce the speed of the compressor. However, such a valve must be made resistent to corrosion from high temperature exhaust gases, and even so is subject to clogging. It may be noted that the exhaust turbine does not tend to clog, probably because of its high speed rotation. Another approach is to utilize a constricter valve in line with the engine air inlet, to reduce the amount of air flow towards the cylinder. However, a constricter increases the back pressure on the compressor, so that the exhaust turbine turns slower. The slower speed of the exhaust turbine results in a higher back pressure for the engine cylinder which reduces efficiency. Still another approach is to utilize a venting air valve on the downpath side of the compressor, to merely vent excessive air into the atmosphere. This approach cannot be utilized where a carburetor is stationed up-path from the compressor, since a valve would exhaust fuel into the atmosphere, which would be dangerous. This venting valve approach can be utilized with fuel injection engines only, and has been known to run turbocharger impellers at dangerously high operational speeds, sometimes causing turbocharger over speeding.

In addition to the above drawbacks of present systems, there is the problem of poor engine response while shifting gears. During rapid acceleration, there is typically a high engine load immediately before the shift, and during the shift there is a momentary closing of the throttle while the turbines lose speed. When the throttle is opened again, it requires a moment for the turbines to pick up speed to supply enough compressed air for rapid acceleration in the new gear. A turbo-charger system which could be utilized on both carburetor and fuel injection engines, which provided high engine efficiency, and which provided good engine response during gear shifting, would be of considerable value in engine design.

SUMMARY OF THE INVENTION

In accordance with one embodiment of the present invention, a turbo-charged engine system is provided which operates reliably and efficiently for both carbureted and fuel injection engines, and which provides good engine response. The turbo-charged engine system is of the type which includes an exhaust turbine that drives a compressor that supplies compressed air to the engine's cylinders. A recirculating passage is provided which can recirculate air from the downstream end of the compressor to the upstream end thereof, and a valve is located along the passage. When the engine load is excessive, the valve opens to recirculate the air to thereby reduce the air pressure at the cylinder inlet. The recirculating valve air causes the compressor to turn at a high speed, so that the exhaust turbine turns at a high speed to minimize the back pressure on the engine cylinder, to thereby increase engine efficiency. In addition, the system provides good response during gear changing in the course of rapid acceleration, when a heavy engine load is encountered immediately prior to the beginning of gear changing, and when the rotating members of the exhaust turbine and compressor will be turning rapidly. After the throttle has been closed during gear changing and is then opened wide, the turbines are still spinning rapidly so that the compressor can supply compressed air to the engine with minimum delay.

The novel features of the invention are set forth with particularity in the appended claims. The invention will be best understood from the following description when read in conjunction with the accompanying drawings.

DESCRIPTION OF THE PREFERRED EMBODIMENT

Figure 1:
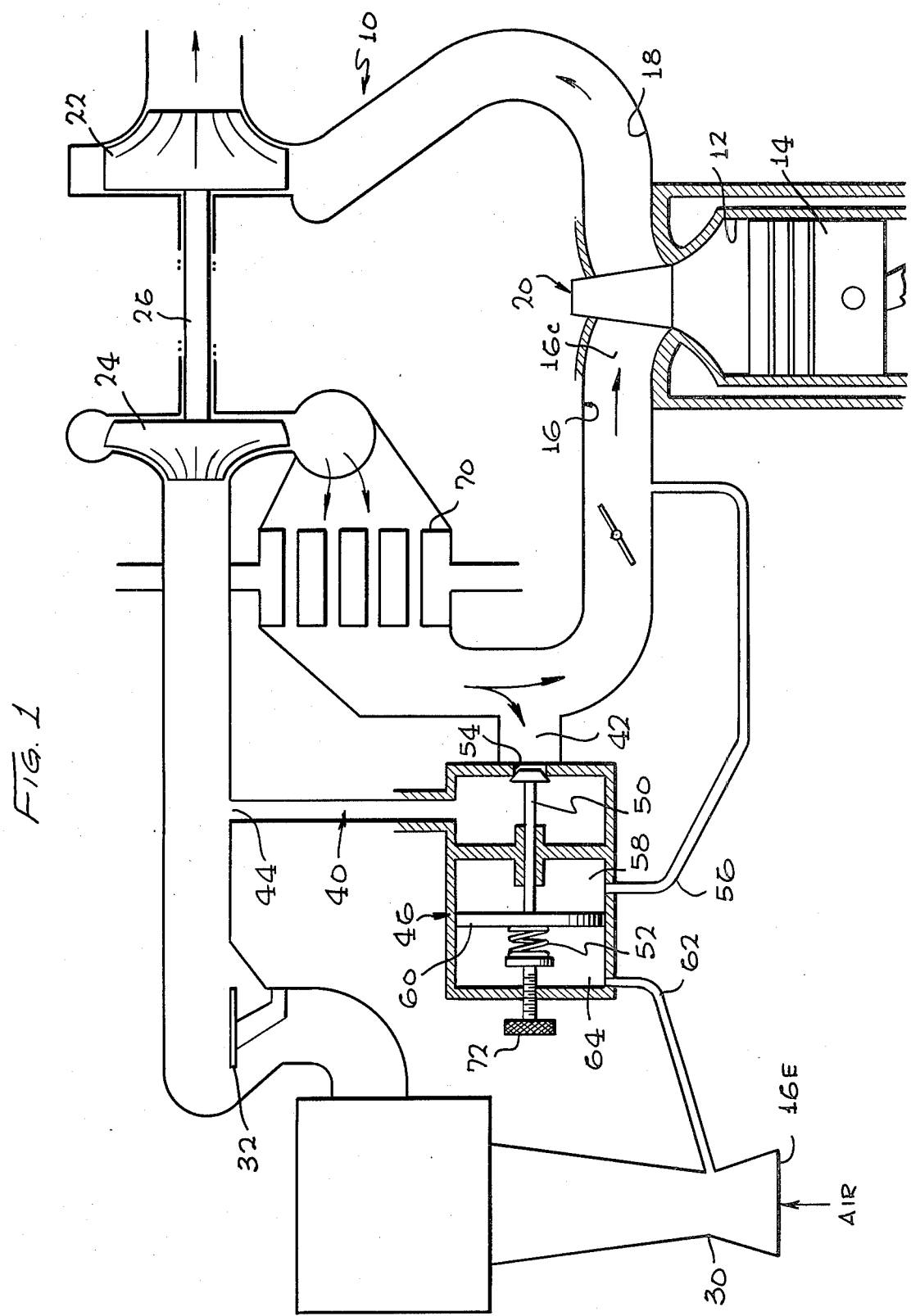
FIG. 1 is a schematic diagram of a turbo-charged engine, constructed in accordance with the present invention.

As illustrated in the figure, a turbo-charged engine 10 includes a cylinder 12 within which a piston 14 reciprocates, an inlet conduit 16 through which air is received into the cylinder, and an outlet conduit 18 through which exhaust gases are exhausted from the cylinder. A valve assembly 10 controls the flow of air and exhaust gases into and out of the cylinder, and the injection of fuel into the cylinder. The term "cylinder" refers to an engine chamber in which combustion occurs, and not to the shape of the chamber which may be, for example, a toroid for a rotary engine.

The engine 10 is of the turbo-charged type wherein an exhaust turbine 22 is located along the exhaust conduit 18 so that it is driven by the exhaust gases. The turbo-charger also includes a compressor or turbine wheel 24 located along the inlet conduit 16 for supplying air above ambient pressure to the cylinder, and a shaft 26 connecting the compressor 24 to the exhaust turbine 22.

In the operation of the fuel injected, turbocharged engine, air passes into an end 16E of the inlet conduit, past a venturi 30, past a fuel metering head 32, past the compressor 24, into a manifold at 16C, and past the valve assembly 20 to the cylinder 12. During engine operation at medium speeds and loads, exhaust gases passing through the outlet conduit 18 drive the exhaust turbine 22 to turn the compressor 24, to thereby supply compressed air to the engine which increases the fuel economy of the engine while also increasing its power output. Under high load conditions, as where a vehicle is accelerating rapidly the turbo-charging could result in damage to the engine if precautions are not taken. That is, during such engine operation, the large amounts of exhaust gases cause the exhaust and turbine and compressor 22, 24 to turn rapidly so that the turbo-charger supplies high pressure air to the cylinder which, when combined with large amounts of fuel, can cause excessive heating of the engine. This is a well recognized problem, and several solutions have been utilized. As mentioned earlier, one solution is to utilize an exhaust waste gate at the exhaust conduit 18 to release exhaust gases directly into the atmosphere without passing through the turbine 22, to turn this turbine more slowly so that less air is compressed by the compressor 24. Another solution is to utilize an escape valve along a portion of the inlet conduit 16 downpath from the compressor 24 to release some of the compressed air to the atmosphere. Another solution is to use a constricter valve along the inlet conduit 16 to limit the flow of air to the cylinder. All of these solutions have affected engine performance, especially during rapid acceleration.

During rapid acceleration of a vehicle, the transmission gear ratio may be changed a plurality of times. Typically, the engine is turning rapidly just before the gear change, but the throttle is then closed at least partially during the gear change. During the brief time that the throttle is closed, the engine slows appreciably because there is considerable load resulting from friction and the like at high engine speed. Following the gear change, the throttle is rapidly opened again. However, the exhaust turbine and compressor 22, 24 will not be spinning rapidly, so that there will initially be a large back pressure along the outlet conduit 18 and a low air pressure along the inlet conduit 16 near the cylinder, all of which lowers engine power and efficiency.

In accordance with the present invention, a recirculating passage 40 is provided which interconnects locations 42, 44 respectively downstream and upstream from the compressor 24. A valve 46 located along the recirculating passage controls the flow of air through the passage. When the engine is operating under a heavy load, so that large amounts of exhaust gas are generated which cause the compressor 24 to spin rapidly and produce a high pressure at the manifold or cylinder end 16C of the inlet conduit, the valve 46 opens to allow much of the compressed air to flow back to the entrance of the compressor 24. This results in a lower air pressure downpath from the compressor at the location 42 and a higher air pressure upstream from the compressor at location 44, so that the compressor can rotate very rapidly. When the engine encounters a heavy load as just before a gear change during rapid acceleration the recirculating valve 46 will be wide open and the compressor 24 will be spinning rapidly. During the brief time when the throttle is then closed for a gear change, the compressor will lose some speed, but will still be spinning rapidly when the throttle is open again following the gear change. When the throttle opens, the valve 46 will quickly close and the rapidly spinning compressor 24 will immediately begin to supply large quantities of compressed air to the engine cylinder. As a result, the engine will experience a rapid pickup of power and speed, to produce good performance. The rapid spinning of the compressor 24 will also cause rapid spinning of the exhaust turbine 22. Thus, when the throttle opens after a gear change, the exhaust turbine 22 will be maintaining a low back pressure on the cylinder, for efficient high power operation of the engine, to increase the engine pickup and fuel efficiency.

The valve 46 includes a valve member 50 which is urged by a spring 52 against a valve seat 54. However, a sensing line 56 extending from the cylinder end 16C of the inlet conduit to a chamber 58 of a valve cylinder can press against a plunger 60 connected to the valve member 50 to lift the valve member off the seat and open the recirculating valve. Thus, when the pressure of compressed air at the cylinder end 16C of the inlet conduit increases to a high predetermined level, the valve member 50 is drawn back against the force of the spring 52, to open the recirculating passage. A high pressure occurs only when the engine is operating at high load, so that the engine generates considerable exhaust gases to rapidly turn the exhaust turbine and compressor but is not operating at a sufficiently high speed to draw in all of the compressed air produced by the exhaust turbine and compressor.

In addition to sensing the pressure of air near the cylinder, the valve 46 is constructed to sense the inflow of air into the entrance end 16E of the inlet conduit 16. This is accomplished by the use of a venturi 30 between the entrance end 16E of the inlet conduit and the discharge end 44 of the recirculating passage. An inflow sensing line 62 extends from the throat of the venturi 30 to a chamber 64 that lies on a side of the plunger 60 opposite the chamber 58. The pressure in the chamber 64 decreases as the volume flow of air into the inlet conduit increases, so that the plunger 16 is drawn further into the chamber 64 to move the valve member 50 open. The use of the inflow sensing line 62 is useful to open the recirculating valve and thereby reduce the pressure at the cylinder end 16C of the inlet conduit when the engine is operating at high speed. When the engine operates at high speed, it can draw in the air at 16C to minimize the pressure thereat so that the valve 46 might otherwise remain closed. The combination of a high load at high speed can be especially injurious to the engine because of the difficulty of removing heat sufficiently fast, and therefore it is desirable to open the recirculating valve at a somewhat lower pressure at high engine speed than at lower speed.

In one system, the compressor turbine 24 will supply an air pressure at 16C of about 4 psi at moderate engine speeds and loads. The sensing line 56 which senses the air pressure supplied to the cylinder, will open the recirculating valve at low engine speeds, typically about 5 psi above atmospheric pressure. At high engine speeds, the effect of the inflow sensing line 62 will result in the valve opening at a manifold air pressure at 16C, of perhaps 3 psi. It may be noted that an intercooler 70 is sometimes used, to cool the compressed air where high compression is employed that overheat the engine. The intercooler will somewhat increase the manifold air density at 16C, which can be offset by resetting the initial pressure applied by the recirculating valve spring 52. This can be accomplished by turning a knob 72 to increase the preloading of the spring.

In summary, the maximum boost or charge pressure can be set for moderate engine loads and speeds by the preload on the spring 52. The sensing line 56 references the valve to the air pressure supplied to the engine, while the inflow sensing line 62 lowers the maximum boost pressure as engine speed increases. The degree of control is directly affected by the area of the venturi 30.

Figure 3:
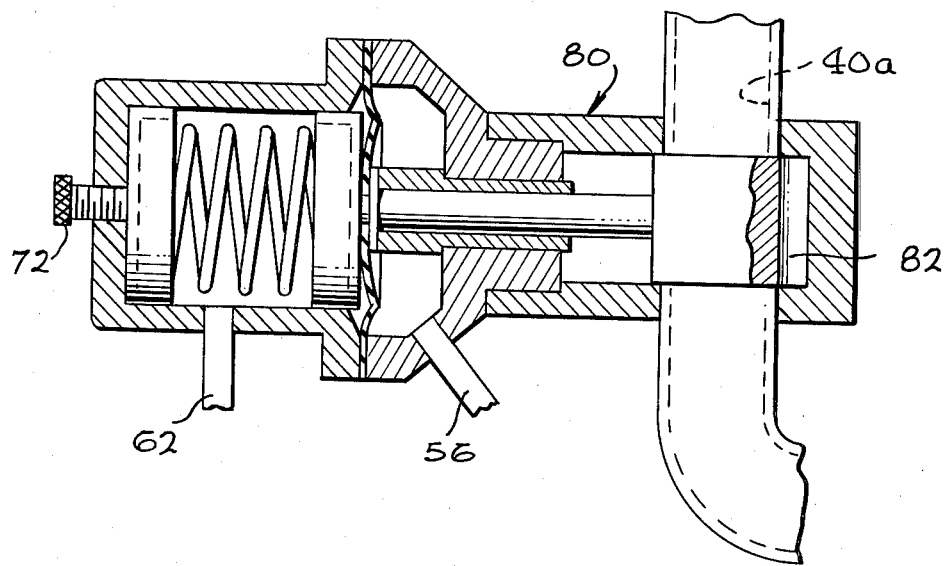
FIG. 3 is a view taken on the line 3—3 of FIG. 2.
Figure 2:
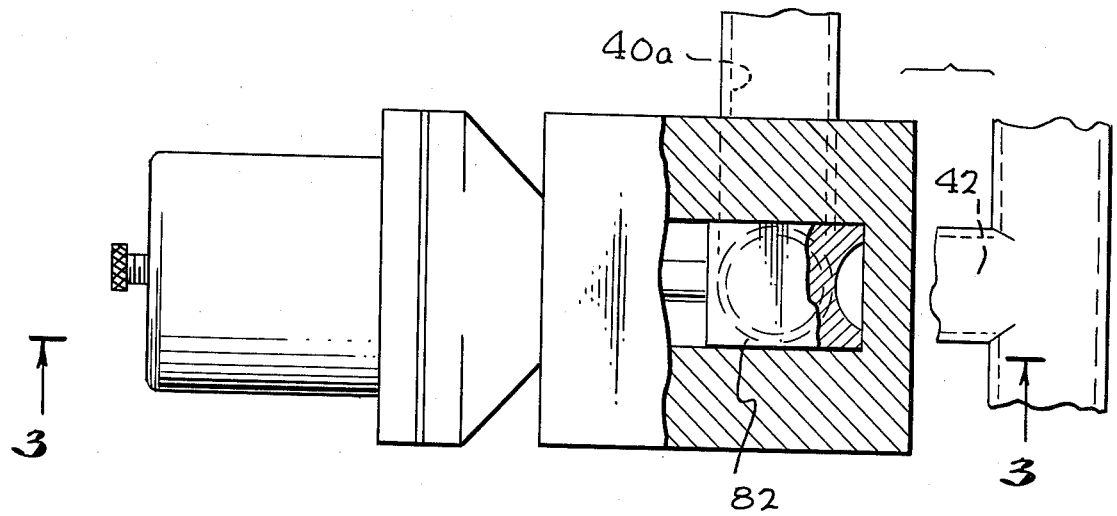
FIG. 2 is a sectional side view of a recirculating valve constructed in accordance with another embodiment of the invention, which can be utilized with the rest of the engine of FIG. 1.

The recirculating valve can be constructed as shown for valve 80 of FIGS. 2 and 3, wherein the plunger or valve member 82 slides across the recirculating passage 40a and therefore the pressure in the recirculating passage does not tend to open the valve. The sensing line 56 which senses the boost pressure at the engine, the inflow sensing line 62 which senses the rate of air flow, and the spring preload setting knob 72 all operate in substantially the same manner, as for the valve 46, to progressively open the recirculating passage as the air pressure at the engine inlet and the flow rate of air into the inlet passage increase. A plug can be substituted for the knob 72, to prevent inexperienced persons from setting the spring preload so that the engine will overheat.

The system of FIG. 1 can be modified to provide better response during cruising of a vehicle when it is travelling rapidly but the driver is depressing the accelerator pedal very little or not at all. In that circumstance, the engine may generate a high vacuum such as 20 inches of water at the location 16C. The path of air flow from 16E to the engine can be shortened by opening the valve 46 to allow incoming air to flow from point 44, through the valve 46, and to the engine intake at 16C, without passing through the compressor 24. This can shorten the air path by a considerable distance such as 2 to 3 feet, to enable better response when the driver wants to accelerate. The system of FIG. 1 can be modified to accomplish this, by connecting a check valve between the two sensing lines 56 and 62 to permit air flow from line 62 to line 56, so as to permit a vacuum at 56 to be applied to the chamber 64 to open the valve. Another check valve may be installed along the line 56 adjacent the chamber 58, to prevent such a vacuum from being applied to the chamber 58.

Thus, the invention provides a turbo-charged engine which has good response during acceleration, and which has generally high efficiency. This is accomplished by the use of a recirculating passage connected to positions along the air inlet conduit located up-path and downpath from the air compressor, and by providing a valve for controlling the recirculation of air therethrough. The valve can be controlled to open and permit recirculation of air when the pressure at the air intake manifold reaches a high level that would tend to produce excessive pressure and temperature in the cylinder. Furthermore, the valve can be made responsive to the volume flow of air towards the cylinders, to reduce the manifold air pressure at which the valve opens as the engine speed increases.

Although particular embodiments of the invention have been described and illustrated herein, it is recognized that modifications and variations may readily occur to those skilled in the art, and consequently it is intended that the claims be interpreted to cover such modifications and equivalents.

I claim:

1. In a turbo-charged engine which includes a cylinder, inlet and outlet conduits respectively leading to and from said cylinder, an exhaust turbine driven by exhaust gases moving along said outlet conduit, and a compressor driven by said exhaust turbine and disposed along said inlet conduit to supply compressed air to the engine, the improvement of means for limiting cylinder pressure, comprising:

a passage which couples locations along said inlet conduit lying respectively downstream and upstream of said compressor;

a valve located along said passage; and means responsive to the volume of air inflow into said inlet conduit and the pressure of air applied through the downstream end of said inlet conduit to said engine, for maintaining said valve closed and for opening said valve only when the volume air inflow into said inlet conduit and the pressure of air applied to said engine both exceed certain values, whereby to permit rapid exhaust turbine operation to lower engine backpressure while limiting air flow to the engine.

2. The improvement described in claim 1 wherein:

said valve includes a valve seat disposed along said passage, a valve member movable against and away from said seat, and means biasing said valve member against said seat;

said inlet conduit has a venturi located upstream of said passage; and said means for opening said valve includes means coupled to said venturi for applying the vacuum created thereat to said valve member to urge it away from said valve seat, and means responsive to the pressure of air applied to said cylinder for applying said pressure to said valve member to urge it away from said valve seat.

3. A turbo-charged engine comprising:

an engine cylinder;

an air inlet conduit leading to said cylinder to supply air thereto;

an air outlet conduit leading from said cylinder to carry away exhaust gases therefrom;

a compressor located along said inlet conduit;

a recirculating passage connecting together locations along said inlet conduit positioned respectively downstream and upstream from said compressor;

a valve located along said passage; and means responsive to both the flow rate of air into said air inlet conduit and the pressure of air applied to said cylinder, for opening said valve when the sensed product of flow rate and pressure exceeds a particular value.

4. The engine described in claim 3 wherein:

said means for opening said valve includes walls forming a venturi located upstream from the upstream end of said recirculating passage, for generating a degree of vacuum dependent upon the volumetric inflow of air, and said valve being urged to open by the degree of vacuum in said venturi, so that the valve tends to open at high air inflow rates.

* * * * *